United States Patent [19]

Griffith

[11] Patent Number: 4,777,026

[45] Date of Patent: Oct. 11, 1988

[54] PRODUCTION OF PHOSPHATES FROM ALKALI-PROCESSES PHOSPHATE ROCK

[76] Inventor: Thomas Griffith, 81 Lynbara Avenue, St. Ives, New South Wales, 2075, Australia

[21] Appl. No.: 12,374

[22] Filed: Feb. 9, 1987

Related U.S. Application Data

[63] Continuation of Ser. No. 788,103, Oct. 16, 1985, abandoned, which is a continuation of Ser. No. 640,776, Aug. 14, 1984, abandoned.

[30] Foreign Application Priority Data

| | | | |
|---|---|---|---|
| Aug. 25, 1983 | [AU] | Australia | PG1034 |
| Oct. 21, 1983 | [AU] | Australia | PG1977 |
| Oct. 21, 1983 | [AU] | Australia | PG1978 |
| Dec. 16, 1983 | [AU] | Australia | PG2883 |

[51] Int. Cl.$^4$ .............................. C01B 25/16
[52] U.S. Cl. ...................... 423/305; 423/167; 423/306; 423/307; 423/308; 423/311; 423/312; 423/314; 423/315
[58] Field of Search ............... 423/167, 305, 306, 307, 423/308, 311, 312, 314, 315

[56] References Cited

U.S. PATENT DOCUMENTS 2,220,790 11/1940 McCullough .................. 423/167
4,106,922 8/1978 Hauschild et al. ............. 423/167

FOREIGN PATENT DOCUMENTS 596302 4/1960 Canada ........................... 423/179.5
2500125 7/1976 Fed. Rep. of Germany .
371632 4/1932 United Kingdom .

OTHER PUBLICATIONS

Skoog et al, *Fundamentals of Analytical Chemistry*, (1963), Holt, Rinehart and Winston, pp. 180–182.
Chemical Abstracts, 70, 36700n.
Chemical Abstracts, 72, 2723y.
Chemical Abstracts, 72, 68719h.

*Primary Examiner*—John Doll
*Assistant Examiner*—Wayne A. Langel
*Attorney, Agent, or Firm*—Cushman, Darby & Cushman

[57] ABSTRACT

Process for production of desired phosphates from naturally occurring phosphates is characterized by treating naturally occurring phosphates under alkaline conditions to produce a material comprising trisodium and-/or tripotassium orthophosphates, carbonating said material in solution, and recovering the desired phosphates from the carbonated solution. The desired phosphates include di- and mono-sodium orthophosphate; pentasodium tripolyphosphate; sodium metaphosphate and its polymers; tetrasodium pyrophosphate; ammonium phosphate; sodium ammonium hydrogen phosphate, magnesium ammonium phosphate; and the corresponding potassium salts thereof.

15 Claims, No Drawings

PRODUCTION OF PHOSPHATES FROM ALKALI-PROCESSES PHOSPHATE ROCK

This is a continuation of application Ser. No. 788,103, filed Oct. 16, 1985, abandoned which was a continuation of application Ser. No. 640,776 filed Aug. 14, 1984, now abandoned.

This invention relates to the production of alkali metal phosphates, such as magnesium ammonium phosphate, ammonium phosphates, and poly- and pyrophosphates, from naturally occurring phosphate rock.

These compounds are of considerable economic importance as fertilizers (alkali metal phosphates, magnesium ammonium phosphate, and ammonium phosphate) and as detergent builders and water treatment agents (alkali metal orthophosphates, polyphosphates, pyrophosphates, and metaphosphates). The processes of the present invention provide cheaper and more rapid methods for production of a variety of phosphates. In preferred embodiments of the invention by-products are recycled, and the amount and polluting potential of waste products requiring disposal is reduced.

The composition of naturally occurring phosphate rocks varies according to the source. Some rocks, for example Florida rock are predominantly calcium phosphate, while others, for example barrandite, are predominantly iron and/or aluminium phosphate. Other rocks, such as Christmas Island C grade, are complex mixtures of calcium, aluminium and iron phosphates. The relative proportions of calcium phosphate, iron phosphate, aluminium phosphate and other components in rocks from different sources are subject to wide variation, as is well known to persons skilled in the art. The processes of the present invention enable naturally occurring phosphate rocks to be used as raw materials, which was not possible in the processes of the prior art.

The phosphates produced include, but are not limited to:
  Di and monosodium orthophosphate.
  Pentasodium tripolyphosphate.
  Sodium metaphosphate and its polymers.
  Tetrasodium pyrophosphate.
  Sodium ammonium hydrogen phosphate.
  Magnesium ammonium phosphate.
  The corresponding potassium salts of the above.

The source of alkali metal orthophosphates includes but is not limited to:

1. The known process of extracting naturally occurring phosphate rocks containing iron and aluminium phosphates with sodium hydroxide solutions.
2. The process of extracting naturally occurring phosphate rocks containing iron and aluminium phosphates with alkali metal carbonate and hydroxide solutions as revealed in my patent application No. PG0662.
3. The process of calcining any naturally occurring phosphate rock with alkali metal carbonates or other alkali metal salts as revealed in my Australian patent application No. 28507/84.

In one form of the invention trisodium orthophosphate is converted to di- or monosodium orthophosphate by carbonation at controlled pH. The phosphates are separated by cooling, leaving a solution of sodium carbonates. The reactions taking place are believed to be represented by the following simplified chemical reactions.

$$2Na_3PO_4 + CO_2 + H_2O \rightarrow 2Na_2HPO_4 + Na_2CO_3$$

and $$Na_3PO_4 + CO_2 + H_2O \rightarrow NaH_2PO_4 + 2NaHCO_3$$

In another form of the invention a mixture of di- and monosodium phosphates is prepared by the above reactions and then heat-treated to give pentasodium tripolyphosphate.

$$2Na_2HPO_4 + NaH_2PO_4 \rightarrow Na_5P_3O_{10} + 2H_2O$$

In a third form of the invention sodium orthophosphates are treated with carbon dioxide and ammonia to form sodium ammonium hydrogen phosphate and sodium carbonates. The sodium ammonium hydrogen phosphate is separated from the sodium carbonates and heat treated to produce sodium metaphosphate or its polymers. A simplified form of the chemical reactions taking place is believed to be represented by the following chemical reactions:

$$H_2O + Na_3PO_4 + NH_3 + CO_2 \rightarrow NaNH_4HPO_4 + Na_2CO_3$$

$$NaNH_4PO_4 + HEAT \rightarrow NaPO_3 + NH_3H_2O$$

In a fourth form of the invention sodium orthophosphates are reacted with ammonia and carbon dioxide at low temperature to form sodium carbonate and a compound approximating to the formula of triammonium phosphate. The latter is separated from sodium carbonate solution and then heated to give di- or monoammonium phosphate. A simplified form of the chemical reactions believed to be taking place is noted below.

$$2Na_3PO_4 + 6NH_3 + 3CO_2 + 3H_2O \rightarrow 2(NH_4)_3PO_4 + 3Na_2CO_3$$

$$(NH_4)_3PO_4 + HEAT \rightarrow (NH_4)_2HPO_4 + NH_3$$

$$(NH_4)_2HPO_4 + HEAT \rightarrow NH_4H_2PO_4 + NH_3$$

In a fifth form of the invention a solution of sodium phosphate is reacted with magnesium carbonate, carbon dioxide and ammonia to yield magnesium ammonium phosphate and sodium carbonates. A simplified form of the chemical reactions believed to be taking place is noted below.

$$2Na_3PO_4 + 2MgCO_3 + CO_2 + NH_3 + H_2O \rightarrow 2MgNH_4PO_4 + 3Na_2CO_3$$

Although the above examples refer to sodium orthophosphates it should be clearly understood that the invention also applies to the corresponding potassium compounds.

ADVANTAGES

Previous art in the alkaline processing of phosphate rocks results in the production of trisodium orthophosphate e.g. Rothbaum & Reeve "Recovery of Alumina and Phosphate from Christmas Island C Phosphate", N.Z. Journal of Science, Vol. II, No. 4, December, 1968.

Trisodium orthophosphate is a valuable product with a limited market and processes have been developed to turn it into other products e.g.:

My Australian patent Nos. 464,459 and 486,139 for producing magnesium ammonium phosphate.

My New Zealand patent No. 163,118 for producing ammonium phosphate.

The economics of the first process rely on sale of by-products such as sodium sulphate which are produced along with magnesium ammonium phosphate. In the processes of my present invention I am able to produce magnesium ammonium phosphate by a regenerative process that does not rely on production of by-products. Furthermore, 1. When producing magnesium ammonium phosphate from trisodium phosphate all the sodium is recycled to produce more trisodium phosphate. The significant expense of buying in alkali metal carbonates or hydroxides (other than that required to make up for losses) is avoided.

2. No by-products such as sodium sulphate are produced and the overall economics are not dependent on their sale.

3. Naturally occurring magnesium carbonates such as magnesite or dolomite can be used and the expense of preparing soluble magnesium compounds such as magnesium sulphate avoided.

The economics of the second process are affected by the large amounts of material that must be recycled, heated, cooled and evaporated. In the processes now disclosed I am able to simplify this process.

Conventional methods of producing ammonium phosphate involve acidifying phosphate rock with sulphuric acid, separating the resulting calcium sulphate from phosphoric acid, and then reacting the phosphoric acid with ammonia.

Some of the advantages of my new process over prior art may be summarized as follows:

1. Ammonium phosphates can be produced from naturally occurring phosphate rocks by regenerative processes in which the only raw materials required are phosphate rock and ammonia. No additional raw material such as sulphuric acid is required.

2. An alkali processing system is involved and the expense of acid resistant equipment is avoided.

3. The amount of waste material, such as gypsum, that requires disposal is reduced.

4. The process allows production of ammonium phosphate from naturally occurring iron and aluminum phosphates, which has not previously been possible with conventional acid processing.

In addition to magnesium ammonium phosphate and ammonium phosphate I am now able to produce a range of valuable sodium and potassium phosphates such as pentasodium tripolyphosphate, potassium dihydrogen phosphate and sodium metaphosphate.

The conventional method of producing these compounds is to produce high purity phosphoric acid either from elemental phosphorus or by reacting sulphuric acid with specially calcined grades of phosphate rock. The wet process high-purity phosphoric acid is then reacted with alkali metal carbonates and hydroxides to produce the required compounds.

The production of elemental phosphorus is expensive, requires large amounts of energy and tends to generate pollution. Wet process phosphoric acid is also expensive to produce in high purity, and results in the production of large quantities of waste byproduct gypsum.

In my process high-purity alkali metal phosphates are produced directly from phosphate rock and alkali metal carbonates and hydroxides; alkaline processing does not bring impurities into solution as does acid processing. Trisodium phosphate made by caustic extraction of low grade rocks such as Christmas Island C grade or by sodium carbonate fusion can be cheaply obtained in high purity. My process removes the extra sodium that is needed for polyphosphate and pyrophosphate manufacture, in a form that can be reused to produce trisodium phosphate. My processes have the further advantage that processing is carried out in an alkaline environment, and expensive acid-resistant construction is not required.

EXAMPLES

The present invention is illustrated by the following non-limiting examples.

EXAMPLE 1

Trisodium orthophosphate extracted by alkaline processing of Christmas Island C grade rock was dissolved at 60° C. in weak sodium carbonate and bicarbonate solution recycled from previous operations.

Carbon dioxide was bubbled into the solution and the temperature gradually lowered to 30° C. while reducing the pH of the solution from 13.5 to 9.2 as measured by a sodium-insensitive pH electrode.

Under these conditions crystals of sodium orthophosphate, essentially disodium orthophosphate with a Na:P ratio of 2:1, were formed. If the pH was not controlled, crystals with Na:P ratio closer to 3:1 were formed.

The sodium orthophosphate crystals were separated from the remaining solution which was then cooled to 20° C. to crystallize out sodium carbonate. The residual solution of sodium carbonate and bicarbonate and some sodium phosphate was recycled to dissolve more trisodium orthophosphate.

By these methods I was able to convert substantially all of the phosphate in trisodium orthophosphate into the disodium form, while recovering one third of the sodium as sodium carbonate which could be reused in alkali extraction of the original rock.

EXAMPLE 2

Disodium orthophosphate prepared by the above method was dissolved in recycled sodium carbonate and bicarbonate solution at 50° C.

Carbon dioxide was bubbled into the solution and the temperature gradually lowered to 20° C. while the pH was reduced from 9.2 to 7.5 as measured by a sodium-insensitive pH probe. Under these conditions crystals of sodium orthophosphate, essentially a mixture of di- and monosodium orthophosphate, were formed with a sodium: phosphorus ratio Na:P of 5 to 3.

The crystals were withdrawn, washed with water and then heat-treated to yield pentasodium tripolyphosphate, $Na_5P_3O_{10}$.

The residual solution, essentially sodium carbonate and bicarbonate, was cooled to 10° C. to crystallize out a mixture of the two carbonates. The residual carbonate solution, containing traces of sodium phosphate, was recycled to yield more trisodium orthophosphate.

By these methods I was able to convert substantially all of the phosphate in trisodium orthophosphate to pentasodium tripolyphosphate. Four ninths of the sodium was recovered in the form of sodium carbonates which could be reused in alkali extraction of the original rock.

EXAMPLE 3

Disodium orthophosphate prepared by the method outlined in Example 1 was heat-treated in the temperature range 550°–560° C. for one hour.

By this method I was able to convert all the disodium orthophosphate to tetrasodium pyrophosphate according to the reaction.

$$2Na_2HPO_4 + HEAT \rightarrow Na_4P_2O_7 + H_2O$$

EXAMPLE 4

Disodium orthophosphate, prepared by the methods outlined in Example 1, was dissolved in recycled sodium carbonate solution at 50° C. Carbon dioxide and ammonia gas, preheated to 40°–50° C. to avoid excessive cooling, were introduced into the solution in equimolar proportions. The temperature was gradually reduced to 15° C. and the pH as measured by a sodium-insensitive electrode was reduced to 7.5.

Crystals of microcosmic salt, $NaNH_4HPO_4$, were removed from solution, washed, and heat-treated to yield sodium metaphosphate. The ammonia driven off was reused for producing microcosmic salt.

The solution remaining after microcosmic salt crystallization was further cooled to 5° C., and mixed crystals of sodium carbonate and sodium bicarbonate removed. The residual solution of sodium carbonates, containing some phosphorus and ammonia, was recycled to dissolve more trisodium phosphate.

EXAMPLE 5

Trisodium orthophosphate extracted from Christmas Island C grade rock was dissolved at 70° C. and then cooled and carbonated in solution to 20° C. and a pH of 9.2. Disodium orthophosphate was precipitated. Sodium carbonate was crystallized out of solution by cooling to 10° C. and reused.

The disodium orthophosphate was redissolved and then treated at 60° C. with more carbon dioxide and with ammonia gas admitted through separate diffusers. The additions of carbon dioxide and ammonia were calculated on the basis of 1.05 moles of each gas for every mole of disodium orthophosphate.

The solution was then cooled to 15° C. when crystals of microcosmic salt (sodium ammonium hydrogen phosphate) separated out. The microcosmic salt was filtered off washed and heated to 600° C. to drive off ammonia and form sodium hexametaphosphate.

EXAMPLE 6

Microcosmic salt produced by methods outlined in Example 4 was dissolved in recycled sodium carbonate and ammonium carbonate solution at 30° C. and further carbon dioxide and ammonia added in gaseous form.

The temperature was gradually reduced to 5° C., while the pH as measured by a temperature-insensitive electrode was increased to 8.

Crystals approximating to triammonium phosphate were separated from the solution, washed, and then heat-treated to give diammonium phosphate. The ammonia driven off was recovered for reuse.

The residual solution was evaporated and then cooled to 20° C. to recover sodium carbonate. Any remaining solution was recycled to dissolve more microcosmic salt. Carbon dioxide and ammonia driven off during evaporation were also recycled. By these methods I was able to convert substantially all the phosphorus in the original trisodium phosphate into ammonium phosphate. At the same time I recovered substantially all the sodium in the form of sodium carbonates which could be used in the alkaline extraction of the original phosphate rock.

EXAMPLE 7

Microcosmic salt produced by methods outlined in Example 4 was dissolved in weak recycled sodium and ammonium carbonate solution and mixed with an ammoniated solution of magnesium bicarbonate in the presence of carbon dioxide at 40° C.

A precipitate of magnesium ammonium phosphate was formed, with the pH being controlled at 8 by additions of ammonia and carbon dioxide to avoid precipitation of magnesium phosphates at high pH, and to maintain magnesium bicarbonate in solution by the presence of ammonia. Magnesium ammonium phosphate was filtered off, washed and heat-treated to remove its water of hydration. The residual solution was cooled to 20° C. to recover sodium carbonate. The residual sodium carbonate solution containing some ammonium bicarbonate in solution was recycled to dissolve more microcosmic salt.

EXAMPLE 8

Dipotassium orthophosphate was prepared by methods similar to those for disodium orthophosphate (Example 1). This compound was heated to 300° C. to drive off water and produce tetrapotassium pyrophosphate.

It will be clearly understood that the invention in its general aspects is not limited to the specific details referred to hereinabove.

I claim:

1. Process for production of desired phosphates from orthophosphates, comprising the steps of
   (a) treating naturally-occurring unsintered phosphate rock containing calcium, iron, and aluminium phosphates in such amount that the total content of iron and aluminium, calculated as $Fe_2O_3$ and $Al_2O_3$ respectively, is greater than 5% by weight of said material, under alkaline conditions to produce a reaction mixture comprising sodium and/or potassium orthophosphates;
   (b) separating solid orthophosphates from the reaction mixture;
   (c) dissolving the solid orthophosphates in alkali metal carbonate solution,
   (d) carbonating the resulting solution with carbon dioxide, and
   (e) recovering the desired phosphates from the carbonate solution.

2. Process according to claim 1, in which the desired phosphates are chosen from the group consisting of di- and mono- sodium orthophosphates, pentasodium tripolyphosphate, sodium metaphosphate and its polymers, tetrasodium pyrophosphate, sodium ammonium hydrogen phosphate, and corresponding potassium salts thereof; and ammonium phosphates and magnesium ammonium phosphate.

3. Process according to claim 1, in which trisodium or tripotassium orthophosphate extracted by alkaline processing of phosphate rock is treated with carbon dioxide in aqueous solution to produce di-sodium or di-potassium orthophosphates, which are recovered from the carbonated solution by crystallization.

4. Process for production of a mixture of monosodium and disodium orthophosphate which comprises preparing disodium orthophosphates by the process of claim 3, and treating said disodium orthophosphate with carbon dioxide in aqueous solution to produce a mixture of monosodium and disodium orthophosphate, which is recovered from the solution by crystallization.

5. Process for production of pentasodium tripolyphosphate which comprises preparing crysals of mono and di-sodium othophosphate by the process of claim 4, washing the crystals with water, and heat treating the washed crystals to produce pentasodium tripolyphosphate.

6. Process for production of tetrasodium or tetrapotassium pyrophosphate which comprises preparing crystals of disodium or dipotassium orthophosphate by the process of claim 3, and heat treating said crystals to produce tetrasodium or terapotassium pyrophosphate.

7. Process for production of sodium ammonium hydrogen phosphate which comprises preparing sodium orthophosphate by the process of claim 3, dissolving the said sodium rthophosphate in sodium carbonate solution, treating the solution with carbon dioxide and ammonia gas and recovering crystals of sodium ammonium hydrogen phosphate from the treated solution.

8. Process for the production of sodium metaphosphate, which comprises preparing sodium ammonium hydrogen phosphate by the process of claim 7, and heat treating the sodium ammonium hydrogen phosphate to produce sodium metaphosphate.

9. Process for the production of triammonium phosphate which comprises preparing sodium ammonium hydrogen phosphate by the process of claim 7, dissolving the sodium ammonium hydrogen phosphate in a solution of sodium carbonate and ammonium carbonate, treating the solution with carbon dioxide and ammonia gas, and recovering triammonium phosphate from the treated solution.

10. Process for the production of diammonium phosphate, which comprises preparing triammonium phosphate by the process of claim 9, and heat treating the triammonium phosphate to produce diammonium phosphate.

11. Process for production of magnesium ammonium phosphate which comprises preparing sodium ammonium hydrogen phosphate by the process of claim 7, dissolving the sodium ammonium hydrogen phosphate in sodium carbonate solution, and adding an ammoniated solution of magnesium bicarbonate in the presence of carbon dioxide to produce a precipitate of magnesium ammonium carbonate.

12. Process according to claim 11, carried out at pH of about 7.

13. A process for the production of sodium hexametaphosphate, which comprises preparing sodium ammonium hydrogen phosphate by the process of claim 7 and heat-treating the sodium ammonium hydrogen phosphae to produce sodium hexametaphosphate.

14. A process for producing desired phosphate from naturally-occurring unsintered phosphate rock containing calcium, iron, and aluminium phosphate in such amount that the total content of iron and aluminium, calculated as $Fe_2O_3$ and $Al_2O_3$ respectively, is greater than 5% by weight of said material, the phosphates being selected from the group consisting of di- and mono- sodium phosphate, pentasodium tripolyphosphate, sodium metaphosphate, tetrasodium pyrophosphate, sodium hydrogen phosphate, ammonium phosphate, and magnesium ammonium phosphate, the processing comprising:
 (a) treating phosphate rock with alkaline solution to produce tisodium orthophosphate,
 (b) separating solid trisodium orthophosphate from the alkaline solution,
 (c) dissolving the trisodium orthophosphate in an aqueous solution,
 (d) treating the solution with carbon dioxide to produce disodium orthophosphate, and
 (e) recovering the desired phosphates.

15. A process for producing mono- and disodium orthophosphates and mono- and dipotassium orthophosphates from naturally-occurring unsintered phosphate rock containing calcium, iron, and aluminium phosphates in such amount that the total content of iron and aluminium, calculated as $Fe_2O_3$ and $Al_2O_3$ respectively, is greater than 5% by weight of said material, comprising the steps of:
 (a) treating the phosphate rock under alkaline conditions to produce trialkali orthophosphate from the treated rock,
 (b) dissolving the trialkali orthophosphate in an aqueous solution,
 (c) treating the solution with carbon dioxide to produce dialkali orthophosphate,
 (d) further treating the solution with carbon dioxide to produce a mixture of mono- and dialkali orthophosphates, and
 (e) crystallizing to recover the mono- and dialkali orthophosphate.

* * * * *